Patented July 15, 1930

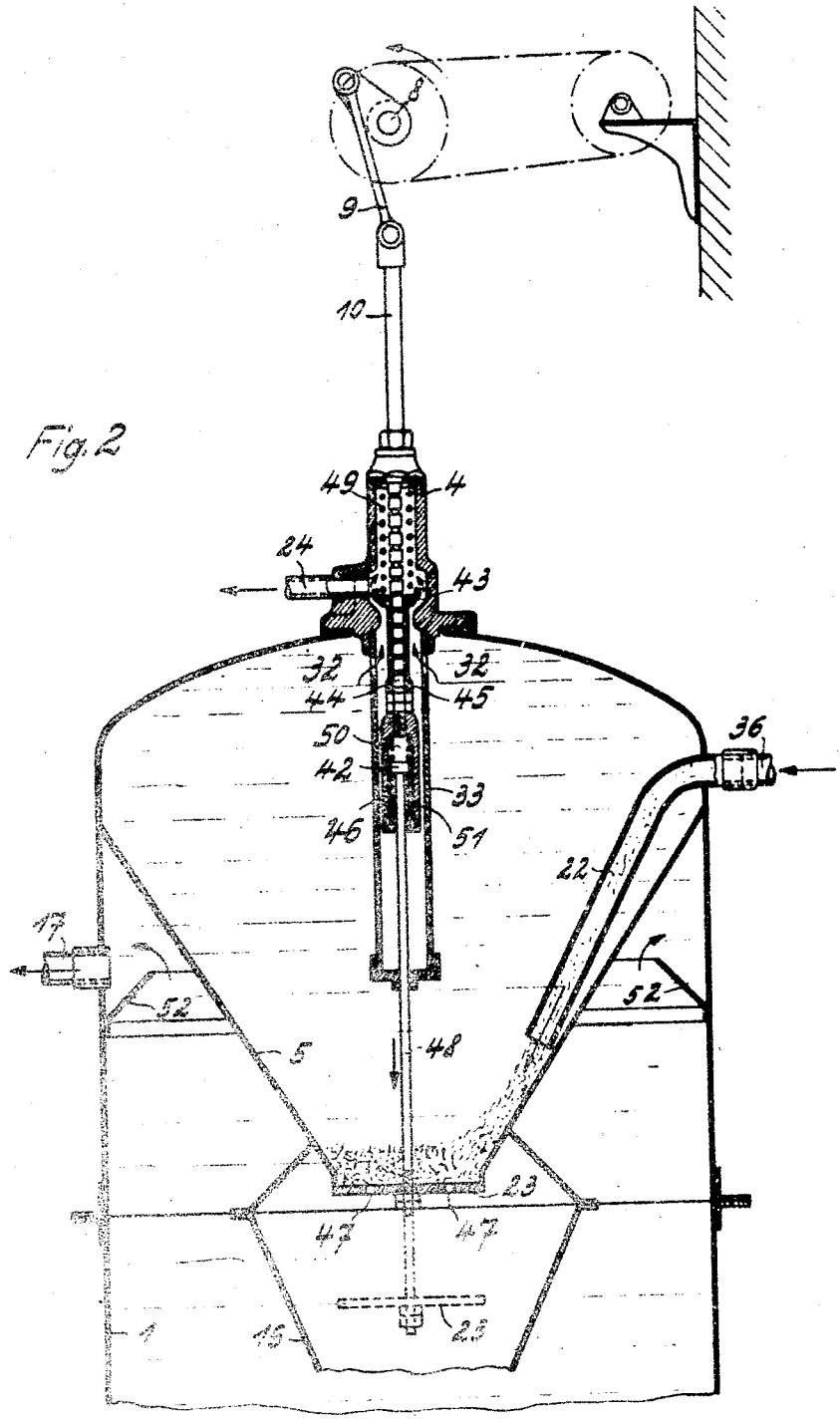

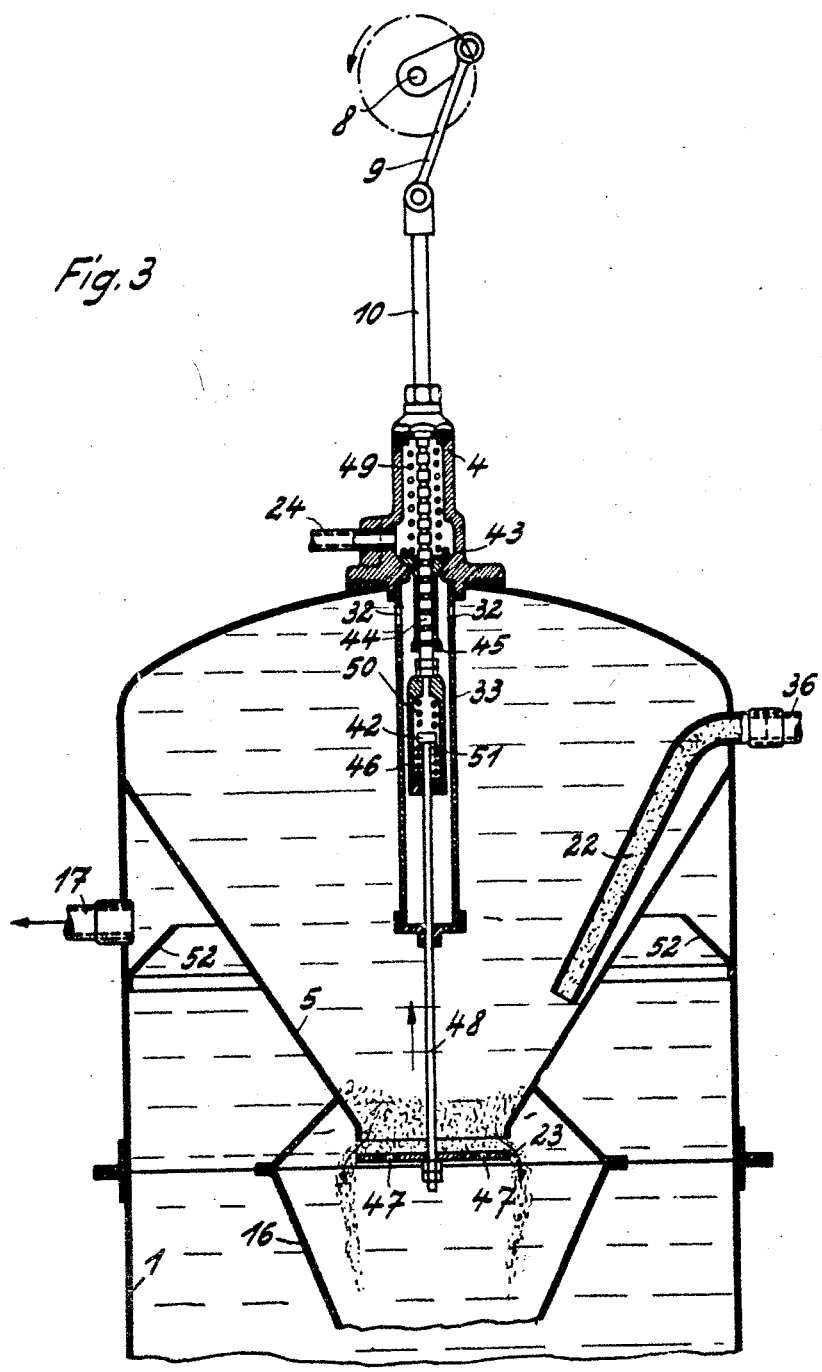

1,770,580

UNITED STATES PATENT OFFICE

WERNER NEUMANN, OF REPPEN, GERMANY

METHOD OF AND MEANS FOR THE CONTINUOUS PURIFICATION OF WATER

Application filed July 14, 1928, Serial No. 292,673, and in Great Britain July 19, 1927.

This invention relates to a method of and means for continuous purification of water by means of chemically active filtering materials.

The hitherto known arrangements in conjunction with water purifying apparatus, in which water is softened by means of artificial or natural zeolites, and in which a continuous regeneration of the filtering material (for example, zeolite) occurs during the operation, have the disadvantage that upon the use of a pressure agent for actuating a working piston or the like the pressure agent is absorbed for the greater part by the force applied to the working piston, whereby the amount of filtering material, which preferably consists of zeolite, to be conveyed per minute is so small that sufficient regeneration of the whole zeolite mass in the short time at disposal is absolutely out of the question. This applies in particular in such cases when particularly hard water is concerned, as in this event very considerable amounts of zeolite require to be dealt with per hour.

An arrangement of the present description furnished with a working piston has already been proposed in conjunction with a small household type of filter. This arrangement, however, has not proved satisfactory, despite the fact that only very small amounts of zeolite material are circulated and regenerated per minute.

Water softening apparatus have furthermore been proposed, in which the regeneration of the zeolite material is performed alternately in single chambers without the material being set into motion. To accomplish this valves for the entry and discharge respectively into and out of the individual chambers of the regenerating liquid are opened and closed alternately by means of lever transmissions from a piston driven in a pressure cylinder by the pressure of water or steam. Since, however, zeolite material may only be satisfactorily regenerated after a thorough rinsing and loosening thereof, this arrangement is not sufficient to fulfil the conditions placed upon the same.

Now it is the object of the present invention to overcome the disadvantages referred to, and to provide a water purifying apparatus in which a sufficiency of freshly regenerated filtering material is allowed for, the regeneration being performed in a special chamber outside of the water purifying container, so that the softening process in the water purifying container may be effected continuously without disturbance to the general operation.

The invention will now be described more fully with reference to the accompanying drawing, in which one form of embodiment is illustrated by way of example.

Fig. 2 is a vertical section through the upper portion of the water purifying container with the valve opened.

Fig. 3 is a vertical section through the same part of the apparatus with the valve closed.

Figure 1:
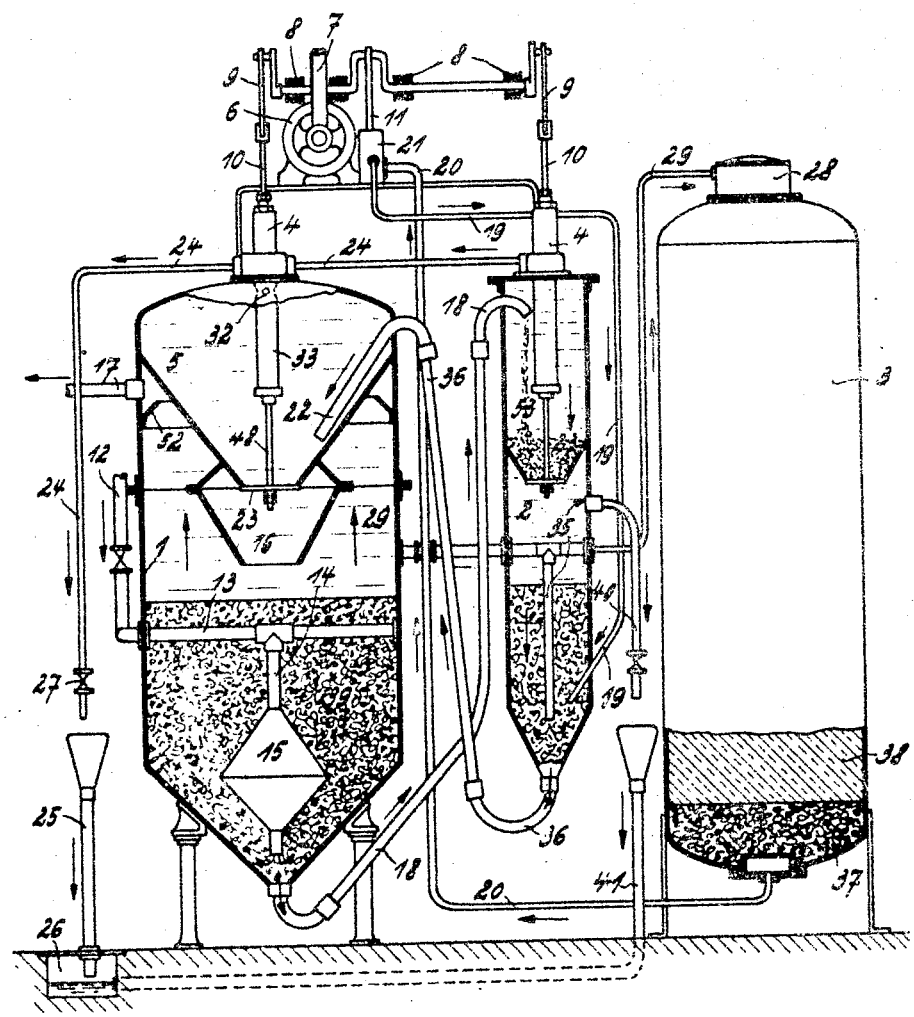
Fig. 1 shows a water purifying plant in diagrammatical form.

Referring now to the drawing, 1 is the self-contained water purifying container for the reception of the zeolite material, and 2 is the adjacent regenerating chamber. 3 is a self-contained vessel for the reception of a common salt solution or a filling of common salt in saturated condition. The containers 1 and 2 are each furnished with an upper valve casing 4, and in the container 1 is provided a special washing chamber 5. The driving power is taken, for example, from an electro-motor 6, which acts through the medium of the wormwheel and worm 7 on the double crankshaft 8 and thus on the crankrod 9 and the upper valve rod 10. The crankshaft 8 is also connected with the crankrod 11 for the operation of a feed regulating apparatus 21.

12 is the intake for the water to be treated, and 13 pipes by means of which the water is conducted to the lowest point 14 of the container 1. 15 is a deflecting member for passing the water through the layer of zeolite 39, and 16 is a washing hood.

The softened water is discharged from the apparatus through the discharge pipe 17. At the bottom of the container 1 is provided a transport pipe 18, through which exhausted zeolite is passed to the compartment 53 of the regenerating chamber 2. 19 is the pressure pipe for the solution of common salt passing under pressure from the regulating apparatus 21 into the regenerating chamber 2. The pipe 20 conveys the solution of common salt from the container 3 to the regulating apparatus 21, the latter serving for adjustment of the particular amount of salt solution which may be necessary in each particular case for the purpose of regeneration.

22 is a transport pipe, which passes regenerated filtering material into the chamber 5, and 23 is a valve of the disc or poppet type, which periodically opens or closes off the chamber 5, or 53 respectively.

Rinsing water and the salt solution as the same is consumed are discharged from the chamber 5, or 53 respectively, through the pipe 24, which is furnished with a choke valve 27, whereby the chambers are periodically in communication with atmosphere. 25 is a discharge pipe leading to the canalization system 26. 28 is the cover member for the salt container 3, and 29 is the connection pipe between the salt container 3 and the water purifying container 1.

The guide sleeve 33 (Fig. 2) for the valve arrangement (Fig. 2) is furnished with apertures 32. Into the regenerating chamber 2 opens a pressure pipe 35, which branches off from the connection pipe 29. 36 is the pipe for conveying regenerated zeolite to the chamber 5. The container 3 is furnished with a gravel or grit base 37 and a filling of salt 38.

The additional reference characters employed will be apparent from the following description of the operation.

After the water purifying container 1 has been filled with a filtering mass 39, for example glauconite, and watered, up to a certain level of material, and the container 3 filled with common salt 38, having a basic layer composed of gravel or grit 37, the water to be treated is introduced through the pipes 12, 13, 14 towards the lowest point of the container 1 (see Fig. 1). The water flows through the layer of glauconite 39 from the bottom towards the top, the same being accorded a certain direction of flow by reason of the deflecting members 15, and softened to the extent of zero as a result of the basylous exchange. The softened water passes towards the top, and flows over the channel 52 into the pipe 17, through which the same is passed to the point of consumption. Upon this operation a part of the softened water at the same time passes through the pipe 29 into the container 3, dissolving therein a part of the salt 38 and forming in the same a saturated salt solution. In order to prevent the glauconite mass 39 from becoming exhausted during the softening process, so that the same will be incapable of offering further exchange, saturated salt solution is passed right at the commencement of the process from the container 3 through the pipe 20 to the feed regulating apparatus 21, and the motor 6 set into operation. In this manner the glauconite mass 39 is continuously regenerated as follows:

By the operation of the motor 6 the crankshaft 8 is caused to rotate, and the valve rod 10, or 48 respectively, is caused to move up and down, the valves 23 and 43 being alternately opened and closed (see Fig. 2). Fig. 2 shows the position, in which the crankshaft 8 has not reached the extent of depressing the rod 10 in the chambers 5 and 53, whereby the chambers 5 and 53 are closed off by means of the valve 23 and communicate with atmosphere through the open outlet valve 43. In this position there occurs a passage of the glauconite mass 39 to the chamber 5, or 53 respectively, due to the pressure of the liquid on the mass 39 prevailing in the container 1 and the regenerating chamber 2. The glauconite mass is accordingly washed into the chambers 5 and 53. It will be understood that a forcing of the glauconite does not occur, the same being "washed" or carried into the chambers 5 and 53, wherein it is rinsed by the superfluous salt solution. This latter occurs by reason of the fact that rinsing water flows through the apertures 47 (Fig. 2) in the valve 23 into the chambers 5 and 53, the same flowing off through the open outlet valve 43 in the pipe 24. By adjustment of the valve 27 (Fig. 1) it is possible to circulate a greater or smaller amount of filtering material, as in this manner the speed of the water in the pipes 18 and 36 may be accelerated or decelerated, so that accordingly a correspondingly greater or lesser amount of filtering material is "washed" or conveyed respectively.

When the valve stems 10 and 48 are further depressed in the chambers 5 and 53 by the crankshaft 8 (see Fig. 3), at first the valves 43 in the casings 4 are closed by the pressure of the spiral spring 49, while the valves 23 commence to open as soon as the valve stems 48 have been somewhat more depressed, the spring 50 exerting on the shoulder 42 a pressure which is transmitted to the stem 48 and the valve 23. Immediately the latter has been opened, the regenerated and rinsed filtering material falls through the hood 16 back into the soft water compartment of the container 1, while at the same time exhausted zeolite material passes into the regenerating chamber 2, as a pressure compensation occurs between the two compartments 5 and 53, whereby conveyance of the filtering material in the pipes 18 and 36 also ceases. During this time salt solution is not forced by the regulating apparatus 21 into the filtering mass in the regenerating chamber 2, resulting in economy in salt. Due to the flow of water through the hood 16 not even the slightest remnants of salt solution reach the softened water, as sufficient rinsing water was previously able to pass into the compartment 5 through the apertures 47 in the valve 23 when the valve 23 was still closed, and with entirely open valve 23 only such amount of softened water enters into the compartment 5 through the hood 16 as is displaced by the quantity of filtering material returned.

Fig. 3 shows the position, in which the valve rods 10, or 48 respectively, are lifted when the crank rod 9 moves upwardly. Immediately the valve 23 moves loosely on to its seating, i. e., when the valve commences to close, the additional upward movement of the piston 46 in the guide sleeve 33 causes the spring 51 to be tensioned, thus exerting a pressure on the collar 42, whereby upon the further upward movement of the piston 46 the valve 23 is moved tightly on to its seating, in which case the chamber 5 is shut off from the soft water compartment of the water purifying container 1, or chamber 53 shut off from the regenerating chamber 2 respectively, the same again communicating with atmosphere, as the valve 43 is open due to the fact that the piston 46 has lifted the sleeve 45, the spring 49 being tensioned. The valve position is then as shown in Fig. 2, so that the operation as described above is able to recommence.

Since the valves 23 in the compartment 5 of the water purifying container 1 and in the compartment 53 of the regenerating chamber 2 are connected in parallel, on each occasion the same amount of exhausted and regenerated filtering material will be conveyed to the chambers 53, or 5 respectively. And since at the same time salt solution and rinsing water flow through the filtering material in the regenerating chamber 2 from the bottom towards the top, in this manner the filtering material is continuously maintained in motion and thereby exceedingly well regenerated without settling.

The salt solution is forced by the regulating apparatus 21 through the pipe 19 into the lower part of the filtering mass (Fig. 1), also the rinsing water through the pipe 35, which branches off from the pipe 29. The salt solution as consumed is discharged through the pipe 40, or 41 respectively, and the rinsing water out of the upper washing chamber 53 towards the valve casing 4, or pipe 24 respectively, as described at the commencement (Fig. 1).

In this manner it is possible to continuously regenerate large amounts of zeolite (1000 kilogrammes per hour, and more), as in the large regenerating chamber 2 considerable amounts of filtering material may be loosely stored, without danger of the material settling during the long period of regeneration, a fact which would result in clogging. As a matter of fact this latter has been the cause of failure in connection with all previous attempts to effect a continuous regeneration, as upon entry into the large regenerating spaces the necessary rate of passage was diminished, whereby the filtering material was provided the opportunity of settling, thus necessarily resulting in a clogging of the pipes and regenerating spaces.

By means of the invention it is now possible to employ natural or artificial zeolite for water softening purposes in continuous operation, as any desired period of regeneration may be allowed for, whereby it is quite possible to readily soften extremely hard water, without setting the apparatus out of operation for the purpose of regeneration. Since in addition large amounts of filtering material may be dealt with each hour, it is possible to make the water purifying containers with vary large dimensions and provide the same in large number, so that extremely large amounts of water may be softened each hour, whereby the regeneration is effected completely automatically during the operation.

It is of course understood that I do not restrict myself to the exact form of embodiment shown, and that various other forms may be devised without departing from the spirit of the invention.

Thus, for example, in place of the crankshaft 8 for operating the valve stems 10 and 48, eccentric having lever transmission may also be employed, and in lieu of the motor 6 it is naturally also possible to employ any other suitable power source, whether of a hydraulical, electro-magnetical or other kind. As indicated in Fig. 2, a belt drive in conjunction with a transmission may be used. Or the arrangement may also be such that the valves are actuated by a momentary switch mechanism, that is to say, in such manner that the valves are maintained completely closed, or open respectively, for as long as possible.

What I claim as new and desire to secure by Letters Patent is:

1. An apparatus for continuously softening water by means of chemically active filtering materials, such as artificial or natural zeolites, more particularly glauconites, which are conducted in circulation by means of water pressure through softening and regenerating containers, said apparatus including a softening container and a regenerating container connected with each other in such manner that the exhausted filtering material is conducted from the softening container to the regenerating container, and simultaneously the regenerated filtering material from the regenerating container to the softening container, said apparatus including valves for simultaneously conveying filtering material to the softening container and the regenerating chamber, said valves being connected in parallel by means of a common control device, said control device being adapted at the same time to actuate a dosing apparatus for the salt solution.

2. Apparatus according to claim 1 including a discharge pipe for salt solution out of the regenerating container, a discharge pipe for passage of scavenging water out of the water cleaning container, and means for throttling said pipes whereby the amounts of exhausted and regenerated filtering material simultaneously conveyed from the one container to the other merely by liquid pressure may be adjusted as desired.

In testimony whereof I have affixed my signature.

WERNER NEUMANN.